US010359005B2

(12) United States Patent
Bellomi et al.

(10) Patent No.: US 10,359,005 B2
(45) Date of Patent: Jul. 23, 2019

(54) SOLID PROPELLANT ROCKET MOTOR

(71) Applicant: AVIO S.P.A., Rome (IT)

(72) Inventors: Paolo Bellomi, Rome (IT); Vincenzo Mancini, Monte Compatri (IT)

(73) Assignee: AVIO S.P.A., Rome (IT)

( * ) Notice: Subject to any disclaimer, the term of this patent is extended or adjusted under 35 U.S.C. 154(b) by 234 days.

(21) Appl. No.: 15/129,396

(22) PCT Filed: Apr. 2, 2015

(86) PCT No.: PCT/IB2015/052448
§ 371 (c)(1),
(2) Date: Sep. 26, 2016

(87) PCT Pub. No.: WO2015/151062
PCT Pub. Date: Oct. 8, 2015

(65) Prior Publication Data
US 2017/0191450 A1    Jul. 6, 2017

(30) Foreign Application Priority Data
Apr. 2, 2014    (IT) .............................. TO2014A0276

(51) Int. Cl.
*F02K 9/08*    (2006.01)
*F02K 9/36*    (2006.01)
(Continued)

(52) U.S. Cl.
CPC ................ *F02K 9/36* (2013.01); *F02K 7/105* (2013.01); *F02K 9/10* (2013.01); *F02K 9/26* (2013.01);
(Continued)

(58) Field of Classification Search
CPC ....... B64G 1/403; B23P 15/008; B65D 45/32; F02K 9/08; F02K 9/32; F02K 9/34;
(Continued)

(56) References Cited

U.S. PATENT DOCUMENTS 6,035,631 A * 3/2000 Cannon .................. F02K 9/343
220/89.2
7,036,674 B2 * 5/2006 McGuire .................... B01J 3/03
220/263

(Continued)

FOREIGN PATENT DOCUMENTS

EP    0238369 A1    9/1987
FR    2518172 A1    6/1983
(Continued)

OTHER PUBLICATIONS

International Search Report and Written Opinion from International Application No. PCT/IB2015/052448 dated Aug. 7, 2015.
(Continued)

*Primary Examiner* — William H Rodriguez
*Assistant Examiner* — Kyle Robert Thomas
(74) *Attorney, Agent, or Firm* — Dorsey & Whitney LLP (57) ABSTRACT

A solid propellant rocket motor has a tubular casing accommodating a mass of solid propellant material and at least one opening for the space in the casing to communicate with the outside closed by a closing head; the closing head being coupled to the casing by means of one or the other of two blocking portions with different strength both carried by a movement device which can be elastically deformed and operated from the outside.

12 Claims, 6 Drawing Sheets

(51) Int. Cl.
*F02K 7/10* (2006.01)
*F02K 9/10* (2006.01)
*F02K 9/26* (2006.01)
*F02K 9/32* (2006.01)
*F02K 9/34* (2006.01)
*F02K 9/38* (2006.01)
*F02K 9/86* (2006.01)

(52) U.S. Cl.
CPC .................. *F02K 9/32* (2013.01); *F02K 9/34* (2013.01); *F02K 9/343* (2013.01); *F02K 9/38* (2013.01); *F02K 9/86* (2013.01); *F05D 2220/80* (2013.01); *F05D 2250/411* (2013.01); *F05D 2260/30* (2013.01); *F05D 2300/501* (2013.01)

(58) Field of Classification Search
CPC ... F02K 9/343; F02K 9/36; F02K 9/38; F02K 9/978; F05D 2300/501; F05D 2260/30
USPC ....... 220/582, 610, 611, 615, 616, 618, 677, 220/682–688, 315, 320, 319; 285/400, 285/403
See application file for complete search history.

(56) References Cited

U.S. PATENT DOCUMENTS

| | | | |
|---|---|---|---|
| 7,802,694 B2* | 9/2010 | Lee ........................... | B01J 3/03 220/319 |
| 7,896,187 B2* | 3/2011 | Haibel ..................... | F16J 13/08 220/233 |
| 2013/0058771 A1 | 3/2013 | Menheere et al. | |

FOREIGN PATENT DOCUMENTS

| | | |
|---|---|---|
| GB | 698390 A | 10/1953 |
| JP | 60047852 A | 3/1985 |

OTHER PUBLICATIONS

Demand for International Preliminary Examination from International Application No. PCT/IB2015/052448 filed Feb. 1, 2016.
International Preliminary Report on Patentability from International Application No. PCT/IB2015/052448 dated Mar. 23, 2016.

\* cited by examiner

SOLID PROPELLANT ROCKET MOTOR

TECHNICAL FIELD

The present invention concerns a solid propellant rocket motor.

BACKGROUND ART

As is known, solid propellant motors are used both in the military field and in the field of space launchers.

In both applications, the known motors comprise an outer casing, which houses a predefined annular mass of solid propellant and is closed at the opposite ends by two closing heads distinct from the casing.

One of said heads carries an ignition device for igniting the solid propellant while the other supports a nozzle for outlet of the exhaust gases resulting from combustion of the propellant inside the casing.

Loading of the solid propellant in the casing, assembly of the heads and connection of the heads to the casing and any subsequent storage are generally performed in sites or on different platforms normally well away from the launch platform.

Both in the storage period and during transport towards the launch platform and in any case for the entire launch preparation phase on the same platform, external causes such as an increase in temperature, an impact or an electrostatic discharge, for example, can cause a sudden and uncontrolled ignition of the solid fuel with devastating effects in terms of financial losses or loss of human life. For this reason, the heads are initially coupled to the casing by means of distinct temporary connecting elements with predefined breaking points which, in the event of spontaneous ignition, rupture due to the action generated by the pressure of the gases inside the casing, permitting an increase in the outflow section of the gases towards the outside. This reduces the pressure inside the motor combustion chamber and, consequently, the thrust generated.

When all the preparatory operations have been positively completed on the launch platform, the temporary connecting elements are removed and replaced with permanent structural elements which permanently connect the heads to the casing, enabling the motor for flight.

The removal of the temporary connecting elements and assembly of the permanent ones involves complications and obliges the technicians in charge to work in difficult conditions exposed to risks.

A condition of safety at spontaneous ignition is never fully achieved when several motors are stacked on top of one another, as in the case of multistage launchers. In said cases, in fact, the permanent connecting elements must be inserted before stacking one motor on top of the motor below which, at this point, is ready for ignition and therefore has the same problems as described before concerning prevention of the effects of spontaneous ignition.

A propeller with closing heads screwed on the ends of an intermediate tubular body is described in JP document S 604 78 52.

DISCLOSURE OF INVENTION

The object of the present invention is to provide a solid propellant rocket motor which solves the above problems simply and inexpensively.

According to the present invention, a solid propellant rocket motor is provided, as claimed in claim 1.

BRIEF DESCRIPTION OF THE DRAWINGS

The invention will now be described with reference to the accompanying drawings, which illustrate a non-limiting implementation example thereof, in which.

BEST MODE FOR CARRYING OUT THE INVENTION

Figure 1:
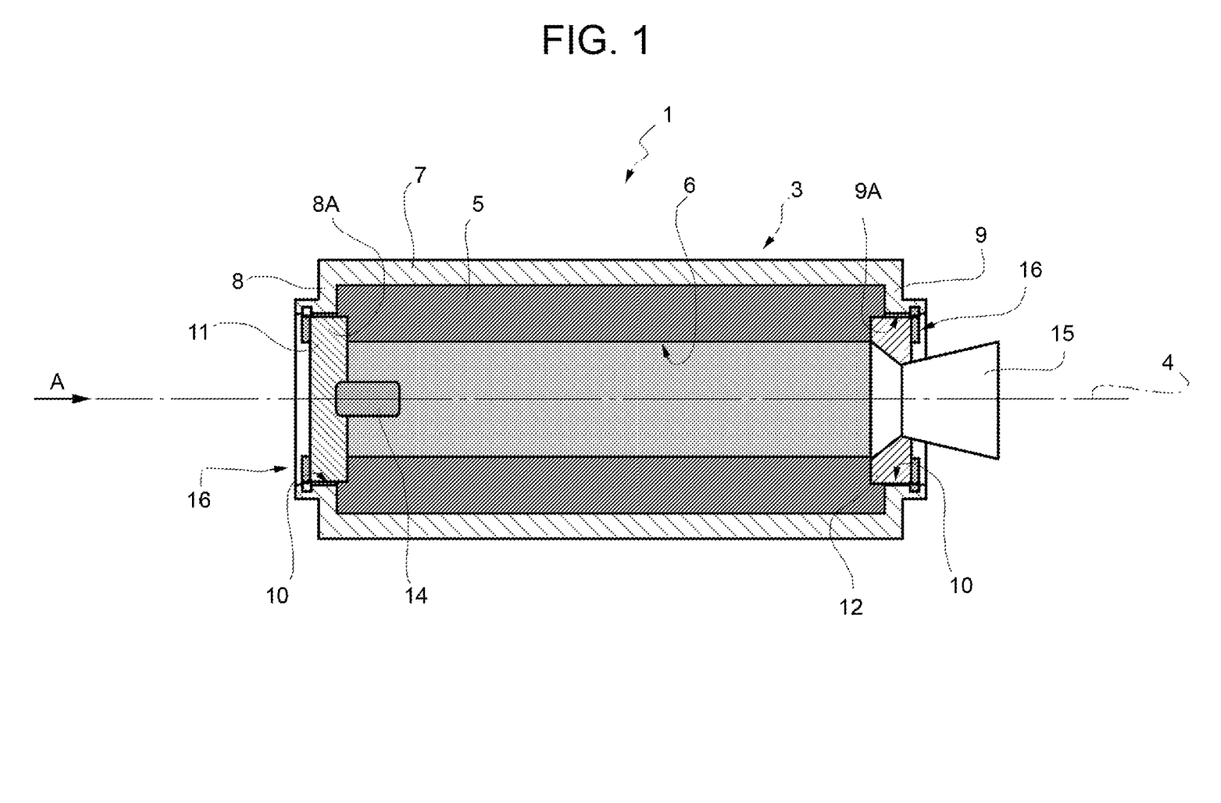
FIG. 1 illustrates, schematically and in section, a preferred embodiment of the solid propellant rocket motor according to the present invention.

In FIG. 1, the number 1 indicates, as a whole, a solid propellant rocket motor.

The motor 1 comprises, in the particular example described, an elongated cylindrical tubular casing 3, which has a longitudinal axis 4 and houses, in a per se known manner, a mass 5 of solid propellant delimiting a central channel 6 defining an elongated combustion chamber along the axis 4.

The casing 3 comprises, in turn, a lateral wall 7 and two frontal walls 8 and 9, which delimit respective passages 10 closed by respective heads 11 and 12.

The head 11 carries an ignition assembly 14, known per se and not described in detail, arranged in an end section of the duct 6 to ignite the solid propellant 5, while the head 12 carries a nozzle 15 for outlet of the exhaust gases resulting from combustion of the propellant 5 inside the casing 3, also known per se and not described in detail.

The heads 11 and 12 are connected to the respective frontal walls 8 and 9 by respective connection assemblies 16 that can be configured from the outside to arrange the motor 1 in an operating or launching configuration or in a safety condition, or in an assembly condition, as will be described in detail below.

Figure 2:
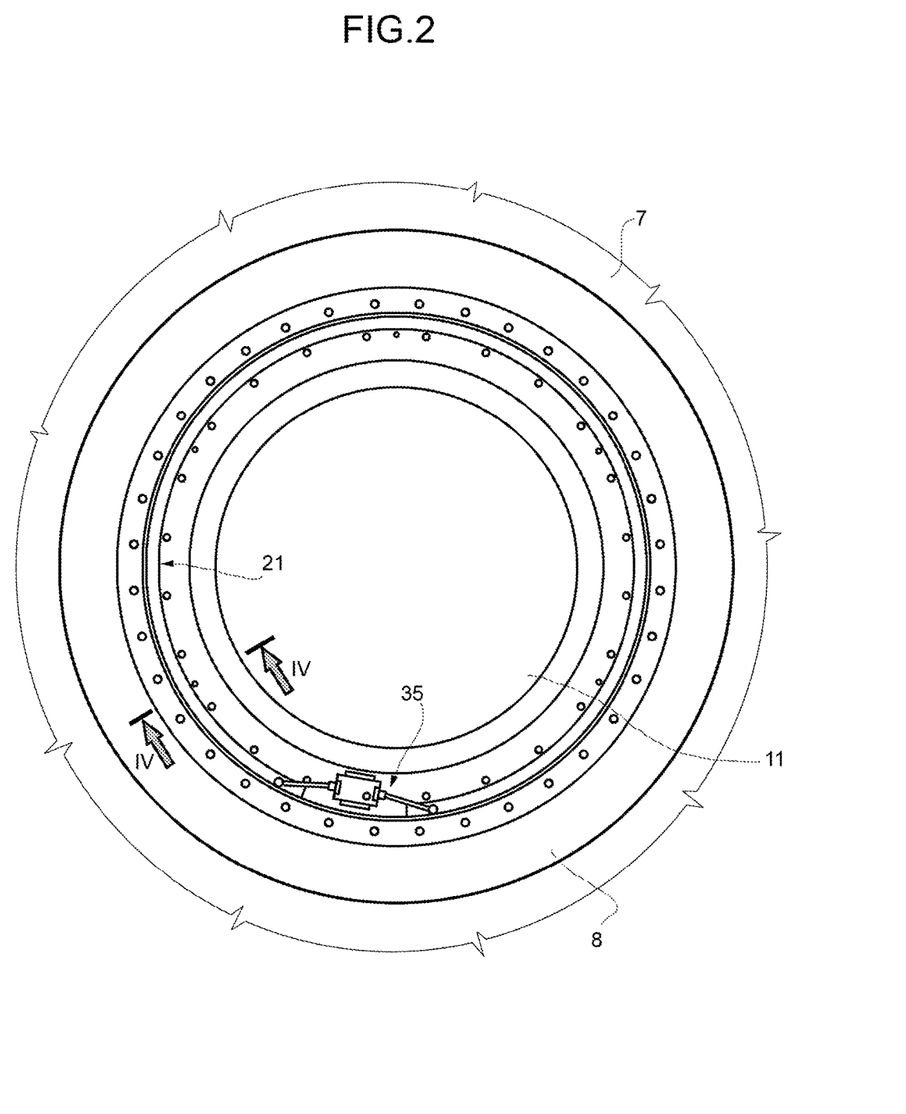
FIG. 2 is a view according to the arrow A of FIG. 1.
Figure 3:
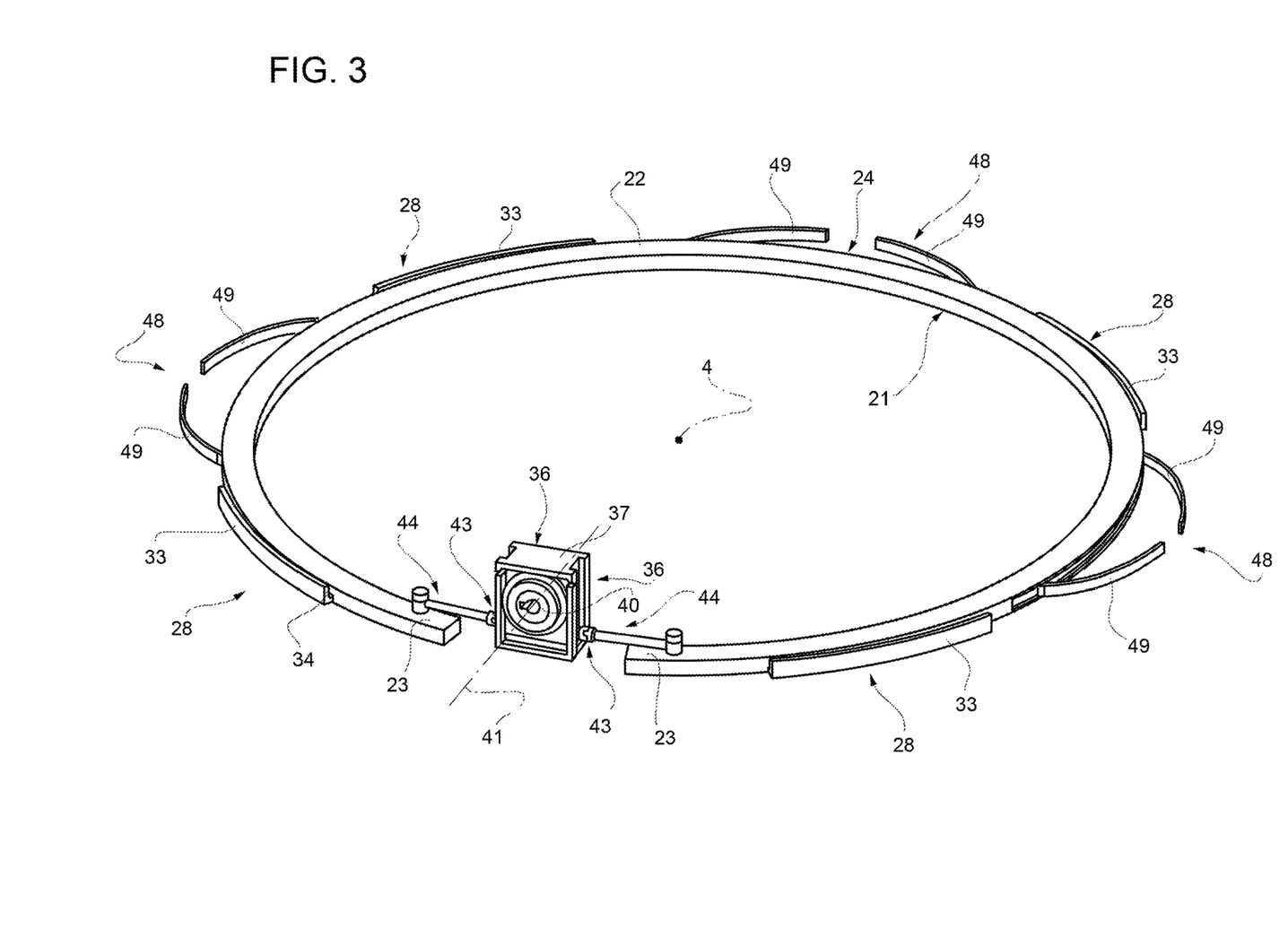
FIG. 3 is a perspective view, on a highly enlarged scale, of a detail of FIGS. 1 and 2.

With reference to FIGS. 2 and 3, each connection assembly 16 comprises a circumferential groove 18 obtained coaxially to the axis 4 inside the respective wall 8,9 through a surface 8A,9A delimiting the relative opening. Expediently, each groove 18 has in radial semi-section a rectangular shape elongated in a radial direction and is delimited by a bottom surface 19 and by an axial abutment surface 20.

With reference to FIGS. 3 to 6, each connecting assembly 16 further comprises an open circular annular body 21, which extends coaxially to the axis 4 and to the outside of the relative head 11,12 and is made of elastically deformable material, for example steel or aluminium alloy. Specifically, the body 21 is shaped like an ordinary Seeger ring, is deformable on a plane orthogonal to the axis 4 and comprises a curved intermediate portion 22 and two free end portions 23 adjacent to and facing each other.

Preferably, the annular body 21 has, in radial semi-section, a shape complementary to the groove 19 and external dimensions such as to engage the groove 19 itself sliding in a radial direction.

Specifically, the annular body 21 is laterally delimited by a cylindrical perimeter surface 24 facing the bottom wall 19 of the groove 18 and axially by two flat surfaces 25 and 26 parallel to each other and orthogonal to the axis 4, the surface 26 of which is arranged abutting against the relative head 11,12, while the surface 25 is adapted to be arranged abutting against, or on the outside of, the surface 20 according to the deformation of the annular body 21.

Again with reference to FIGS. 3 to 6, the body 21 carries a plurality of radial appendixes 28, which are distributed at a predefined pitch on the perimeter surface 24, protrude from the surface 24 and in this specific case constitute with the annular body 21 part of a body made in one single piece.

Alternatively, according to a variation, the appendixes 28 are welded on the surface 24.

Figure 7:
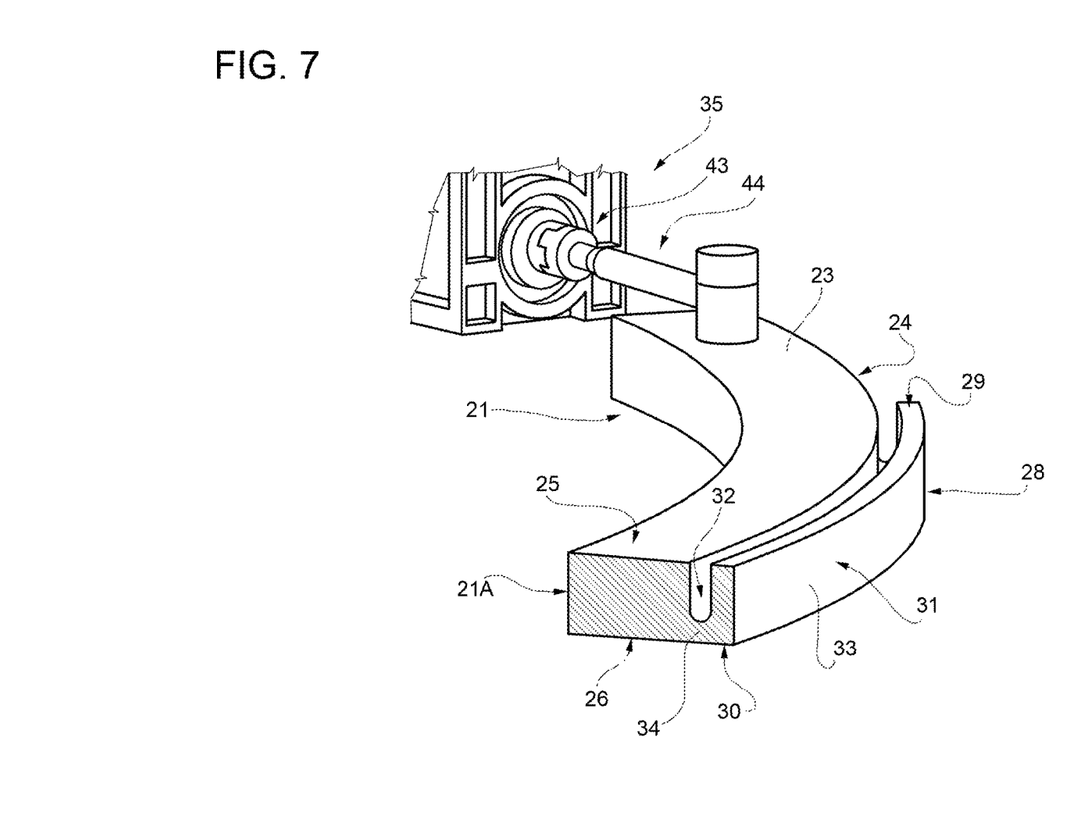
FIG. 7 illustrates, on an enlarged scale, a detail of FIG. 3.

Each appendix 28 has a resistant radial section which is smaller than the section of the annular body 21, as can be clearly seen from FIG. 7, and is axially delimited by two axial surfaces 29 and 30 coplanar with the surface 25 and with the surface 26 respectively (FIG. 7).

Each appendix 28 is then laterally delimited by a cylindrical surface 31 parallel to and facing the bottom surface 19 of the groove 18.

In the particular example described, each appendix 28 has in radial section an upturned L shape and comprises two curved walls 33 and 34 orthogonal to each other and delimiting with the surface 24 a curved axial channel 32 having an axial opening facing outwards.

Figure 8:
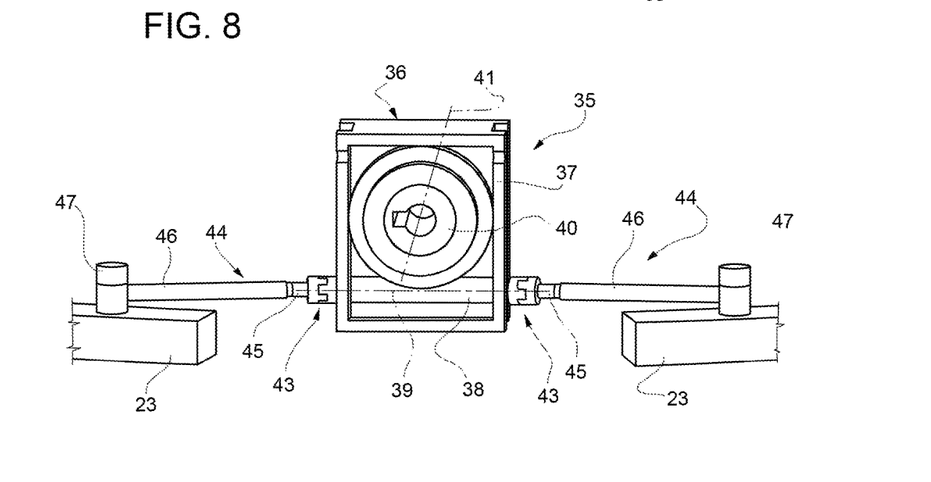
FIG. 8 illustrates schematically, in a perspective view and on an enlarged scale, a further detail of FIG. 3.

With reference to FIGS. 2, 3 and 8, each assembly 16 further comprises a device 35 for inflexion or elastic deformation of the annular body 21. In the particular example described, each device 35 is arranged between the relative end portions 23 and outside the relative head 11,12. Each device 35 comprises an actuation assembly 36, in turn comprising a frame 37 permanently connected to the relative head 11,12 between the terminal portions 23, a worm 40 coupled to the frame 37 to rotate about an axis 41 orthogonal to the axis 4 and a helical wheel 38 engaging with the worm 40 and revolving about an axis tangential and orthogonal to the axes 4 and 41. Conveniently, the worm 40 is manually activated by an operator from the outside of the casing 37 and the head 11,12 by means of an appropriate wrench, not illustrated, which is inserted in the hollow hub of the worm 40.

Alternatively, according to a variation, the worm 40 is driven by an electric, hydraulic or pneumatic motor controlled by a dedicated control unit, not illustrated, which can be activated in remote mode.

The opposite axial ends of the wheel end 39 protrude outside the casing 37 and are each connected to a relative end portion 23 by means of a respective corner joint 43, for example of cardan type, and via a relative screw/screw-nut assembly 44.

Each assembly 44 comprises a screw 45 angularly integral with the relative joint 43 and a screw-nut 46 hinged to the respective portion 23 in a position angularly fixed by means of a pin 47 parallel to the axis 4.

Again with reference to FIG. 3, the assembly 16 comprises, lastly, a plurality of pairs 48 of elastic fins 49 arranged along the outer periphery of the annular body 21 between two consecutive appendixes.

The fins 49 of each pair 48 of fins are curved fins with concavity facing towards the surface 24 of the annular body 21 and are integrally connected to the surface 24 itself, for example, by welding or bolting. In a non-deformed condition, the fins 49 of each pair 48 of fins extend from the surface 24 towards each other and towards the outside, whereas in a condition of maximum deformation they envelop the surface 24 without coming into contact with each other. The fins 49 have, in a direction parallel to the axis 4, dimensions such as to engage by sliding in the groove 18 to maintain, when arranged in a non-deformed or partially deformed condition, the annular body 21 in an assembly position, illustrated in FIG. 4, in which the annular body 21 extends in a position coaxial to the axis 4 and the appendixes 28 are arranged outside the groove 18.

Figure 4:
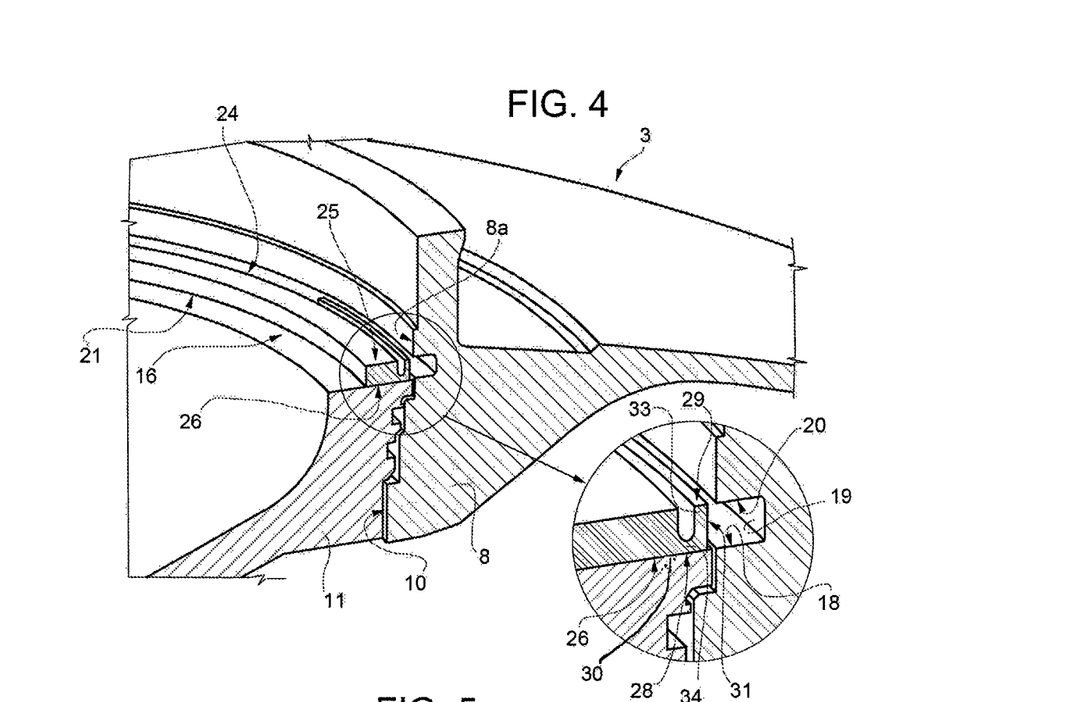
FIG. 4 is a section, on an enlarged scale, according to the line IV-IV of FIG. 2.

Operation of the devices 16 will now be described considering the head 11, analogous considerations obviously apply to the head 12, and starting from the assembly condition illustrated in FIG. 4, in which the solid propellant material is accommodated in the casing 3, the head 11 is inserted in the passage 10, the annular body 21 is maintained by the device 35 in a practically non-deformed condition with its surface 26 in contact with the head 11, the fins 49 are partially accommodated in the groove 18 and abutting against the surface 19 and the appendixes 28 are arranged on the outside of the groove 19.

Figure 5:
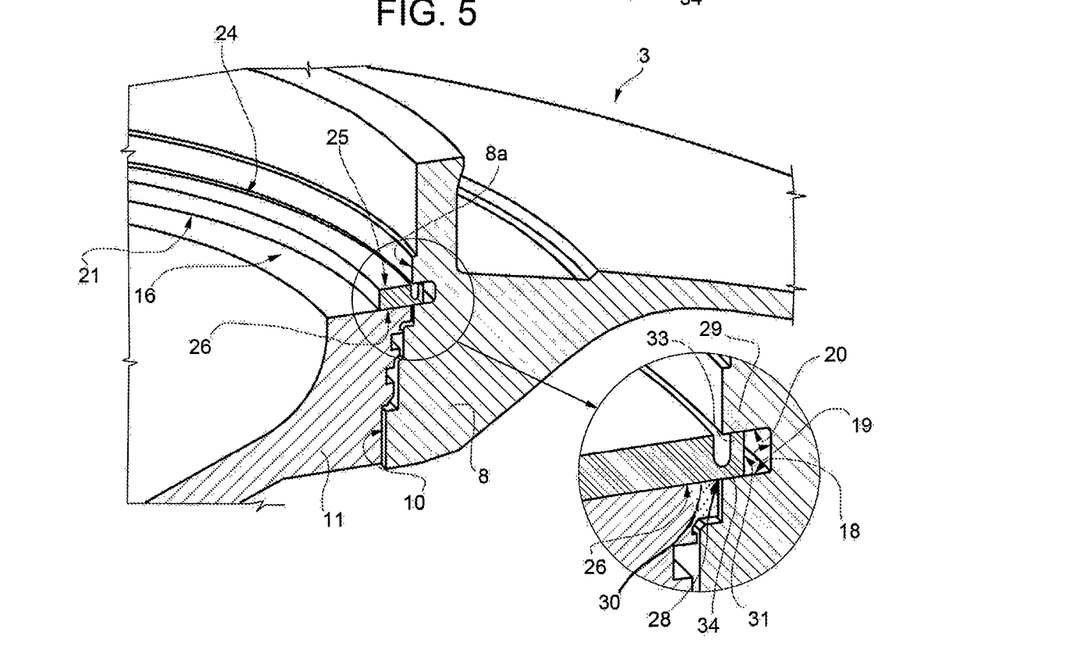
FIGS. 5 and 6 are figures analogous to FIG. 4 and illustrate a detail of FIG. 4 in two different functional positions.

Starting from said assembly condition, when it is necessary to set the motor 1 to a safe condition, for example in order to be stored, transported, positioned on the launch platform and/or coupled to the unit to be transported, acting from the outside on the device 35, the annular body 21 is progressively deformed spacing its end portions 23 from each other. Following said spacing, the fins 49 elastically deform, moving progressively closer to the annular body 21 and the appendixes are progressively inserted inside the groove 18. The deformation of the annular body 21 continues until the walls 33 are completely arranged abutting against the surface 20 and the channels 32 communicate axially with the outside, as illustrated in FIG. 5.

Having reached this position which is indicated, in the particular example described, by a section of the screws 45 coloured green and directly visible from the outside, the motor 1 is arranged in a safe condition in which it is not able to develop the maximum rated power. In said condition, in fact, the head 11, while closing to seal the casing 3, is blocked with respect to the casing 3 by deliberately weakened or breakable portions, so that a sudden pressure increase inside the casing 3 resulting from accidental ignition of the solid propellant 5 is interrupted, allowing the head 11,12 to disengage from the casing 3 when the pressure value inside said casing 3 exceeds a threshold value at the preset design stage, expediently in the order of 10 bar or equal to a predefined percentage of the motor operating pressure.

In this way, the propellant continues to burn but with reduced combustion speed and, above all, without providing the necessary thrust for flight and therefore in conditions of greater safety for the personnel in charge.

Figure 6:
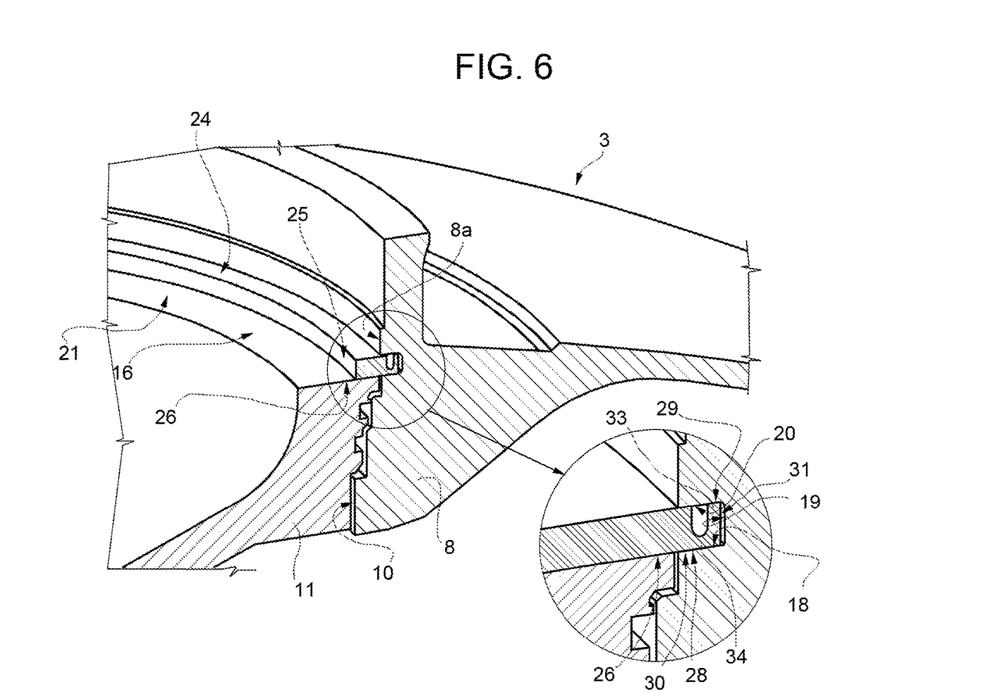

When all the operations for preparation of the motor 1 and connection of the same to the units to be moved have been positively completed, the motor 1 is set to a propulsion position by spacing, again via device 35, the portions 23 from each other and elastically deforming the body 21 until bringing an outer perimeter portion 21A of the annular body 21 inside the groove 18, abutting against the surface 20 of the groove 18, as indicated in FIG. 6.

Once said position has been reached, indicated by a coloured section, for example red, of the screws 45, the head 11 is permanently blocked with respect to the casing 3 regardless of the pressure present inside the casing 3 since the annular portion 21A has a much bigger resistant section than the resistant section of the appendixes 28. In said condition, the motor 1 is ready to be used.

From the above it therefore appears obvious that, with respect to the known solutions, the devices 16 described allow the motor 1 to be configured extremely rapidly and particularly easily. In particular, the devices 16 allow the motor 1 to be set to a safe condition or a propulsion operating condition in addition to an assembly position by simply operating an actuator assembly arranged on the outer periphery of the casing 3 and, therefore, without the need to disassemble elements and re-fit others in their place, as in the solutions known today.

The above is essentially a consequence of the fact that in the devices 16 described, the portions with different strength are all carried by one single body which performs the dual function of support and movement and said portions replace one another by means of a simple radial forward movement within a circumferential groove which is not only delimited by a common supporting surface but is such as to accommodate the weakened appendixes 28 when the heads 11,12 are blocked by the portion 21A.

The use of the devices 16 described is particularly advantageous in cases in which two or more motors 1 are stacked on top of one another since, unlike the known solutions, the various motors are set to their operating condition simultaneously and only after all the other assembly and preparation operations have been completed, thus increasing safety on the launch platform.

From the above, it is obvious that modifications and variations can be made to the devices 16 described. In particular, the appendixes 28 and the portion 21A could be carried by a support and movement body different in construction terms from the elastic body 21 but always such as to selectively arrange the blocking portions with different strength between at least one of the heads 11,12 and the casing 3.

Furthermore, both the weakened appendixes 28 and the fins 49 provided to maintain the portions with different strength in a reference position around the axis 4 could be different in terms of geometry and/or number.

Lastly, also the casing 3 and the device 35 for deformation of the annular body 21 could be different from those indicated, likewise the manner of indicating to an operator the instantaneous functional configuration of the motor 1 could be different.

Lastly, it is obvious that the motor 1 described could comprise one single configurable device 16.

The invention claimed is:

1. A solid propellant rocket motor, comprising:
    a cylindrical tubular outer casing accommodating a mass of solid propellant material, the cylindrical tubular outer casing having at least one opening for a space in the cylindrical tubular outer casing to communicate with an outside;
    a closing head for closing said at least one opening; and
    means for connecting said closing head to a connection portion of said cylindrical tubular casing; said means for connecting include:
        an annular abutting surface carried by said cylindrical tubular outer casing;
        a first blocking portion;
        at least a second blocking portion having a lower strength than said first blocking portion;
        wherein said second blocking portion protrudes from said first blocking portion, and said first and second blocking portions form part of a radially elastically deformable, annular open body made in one piece;
    wherein said annular open body include opposite end portions adjacent to each other; and
    an actuator interposed between said end portions for spacing in a circumferential direction the end portions relative to each other and for elastically deforming said annular open body;
    wherein said connection portion of said cylindrical tubular casing delimits said at least one opening, said connection portion includes an inner circumferential groove obtained in said connection portion and partly delimited by said annular abutting surface;
    wherein said actuator elastically deforms said annular body such that said second blocking portion is positioned between said closing head and said annular abutting surface when said solid propellant rocket motor is in a safety condition, and
    said actuator elastically deforms said annular body such that said first blocking portion is positioned between said closing head and said annular abutting surface when said solid propellant rocket motor is in an operating condition.

2. The solid propellant rocket motor according to claim 1, wherein said first blocking portion includes a curved elongated portion comprising a plurality of said second blocking portions distributed along an outer periphery of said first blocking portion.

3. The solid propellant rocket according to claim 1, said inner circumferential groove accommodating said second blocking portion when said first blocking portion is arranged between said closing head and against said annular abutting surface.

4. The solid propellant rocket according to claim 3, wherein said actuator includes a first colored zone and a second colored zone for indicating a motor configuration or status that can be seen from the outside; said first colored zone indicating said operating condition of the motor corresponding to an inserting condition of said first blocking portion between said closing head and said annular abutting surface, and said second colored zone indicating said safety condition corresponding to an inserting condition of said second blocking portion between said closing head and said annular abutting surface.

5. The solid propellant rocket according to claim 4, wherein said actuator is arranged along an outer periphery of said cylindrical tubular outer casing.

6. The solid propellant rocket according to claim 1, wherein said actuator includes at least one screw/screw-nut assembly.

7. The solid propellant rocket according to claim 1, wherein said actuator is manually activatable from the outside of said cylindrical tubular outer casing.

8. The solid propellant rocket according to claim 1, further comprising elastic fins carried by said first blocking portion and extending between said second blocking portions for positioning said first and second blocking portions in an inoperative reference position, wherein the first and second blocking portions allow a free movement of said closing head with respect to said cylindrical tubular outer casing.

9. The solid propellant rocket according to claim 8, wherein said second blocking portions include at least a pair of said second blocking portions.

10. The solid propellant rocket according to claim 8, wherein said elastic fins extend partly inside said circumferential groove carried by said connection portion and axially delimited by said annular abutting surface.

11. A solid propellant rocket motor, comprising:
a cylindrical tubular outer casing accommodating a mass of solid propellant material, the cylindrical tubular outer casing having a first axial end and a second axial end, at least one of said first axial end and second axial end having an opening;
a closing head adapted to close said opening, wherein the cylindrical tubular outer casing comprises a connection portion adapted to receive said closing head and surrounding said opening;
in said connection portion, a circumferential groove surrounding said opening;
a radially elastically deformable, annular open body comprising opposite end portions facing each other, wherein the annular open body comprises a first locking portion and a second locking portion adapted to lock the closing head to the cylindrical tubular outer casing, the second locking portion projecting radially outwardly beyond the first locking portion, the first locking portion having a first strength and the second locking portion having a second strength, the first strength being higher than the second strength;
an actuator interposed between said opposite end portions of the annular open body and adapted to move the opposite end portions apart from one another in a circumferential direction and to elastically deform said annular open body such that:
in a rocket motor safety condition, the second locking portion is positioned between said closing head and an annular abutting surface formed by the circumferential groove; and
in a rocket motor operating condition, the first locking portion is positioned between said closing head and said annular abutting surface.

12. A solid propellant rocket motor, comprising:
a cylindrical tubular outer casing accommodating a mass of solid propellant material, the cylindrical tubular outer casing having a first axial end and a second axial end, at least one of said first axial end and second axial end having an opening;
a closing head adapted to close said opening, wherein the cylindrical tubular outer casing comprises a connection portion adapted to receive said closing head and surrounding said opening;
in said connection portion, a circumferential groove surrounding said opening and forming an annular abutting surface;
a radially elastically deformable, annular open body comprising:
    opposite end portions facing each other; and
    a plurality of appendixes projecting radially outwardly from the annular open body; and
an actuator interposed between said opposite end portions of the annular open body and adapted to elastically deform said annular open body selectively in:
    a first position, wherein the appendixes are in contact with the closing head and the annular abutting surface; and
    a second position, wherein the annular open body is in contact with the closing head and the annular abutting surface.

* * * * *